Aug. 13, 1935. E. H. DAMON Re. 19,664

PROCESS OF IMPROVING CARBON BLACK

Original Filed June 15, 1931

INVENTOR.
Edward H. Damon
by Yeomans & Witter
Attys

Reissued Aug. 13, 1935 Re. 19,664

UNITED STATES PATENT OFFICE 19,664

PROCESS OF IMPROVING CARBON BLACK

Edward H. Damon, Pampa, Tex., assignor, by mesne assignments, to Cabot Carbon Company, Pampa, Tex., a corporation of Massachusetts Original No. 2,005,022, dated June 18, 1935, Serial No. 544,647, June 15, 1931. Application for reissue June 20, 1935, Serial No. 27,555

10 Claims. (Cl. 134—60)

This invention relates to improvements in methods of treating carbon black whereby certain selected characteristics may be imparted to it in accordance with the use for which it is intended. In a broad aspect, my invention consists in modifying the properties of commercial carbon black by subjecting it to a controlled oxidation in such a manner as to increase its oxygen content.

It has been appreciated for some time that various properties of carbon black, such as color, length, flow, iridescence, tinting strength, etc., may be varied or intensified by oxidation and this has been done heretofore to a more or less imperfect extent in the impingement process of manufacturing carbon black by varying the interval which the carbon black is allowed to remain upon the channel irons or rolls. Such procedure has, however, not only reduced the amount of yield but has affected some qualities of the carbon black adversely while improving others.

I have discovered that more efficient and accurate results may be achieved by subjecting carbon black, which has been produced under conditions resulting in maximum yield, to a supplementary and separate oxidizing treatment under controlled conditions. In carrying out my invention I have secured satisfactory results by subjecting commercial carbon black to heat within definite limits and agitation in the presence of atmospheric oxygen.

The treatment contemplated by my invention is to be clearly distinguished (1) from cracking, which consists in heating in a non-oxidizing atmosphere and may be represented by the reaction, $CH_4=C+2H_2$, (2) carbonization, which consists in heating with or without oxygen to cause selective distillation and oxidation of previously entrapped tarry bodies, and (3) combustion of carbon, which may be represented by the reaction $C+O_2=CO_2$. On the contrary, the process of my invention is concerned primarily with the addition of oxygen or carbon oxides to carbon black, forming a stable union and thus producing a new product having altered properties and characteristics. I have to contend with the combustion effects for commercial reasons only and have discovered that, under favorable conditions, the reaction $XC+YO=CxOy$ can be caused to proceed as fast as the combustion reaction, $C+O_2=CO_2$.

Figure 1:
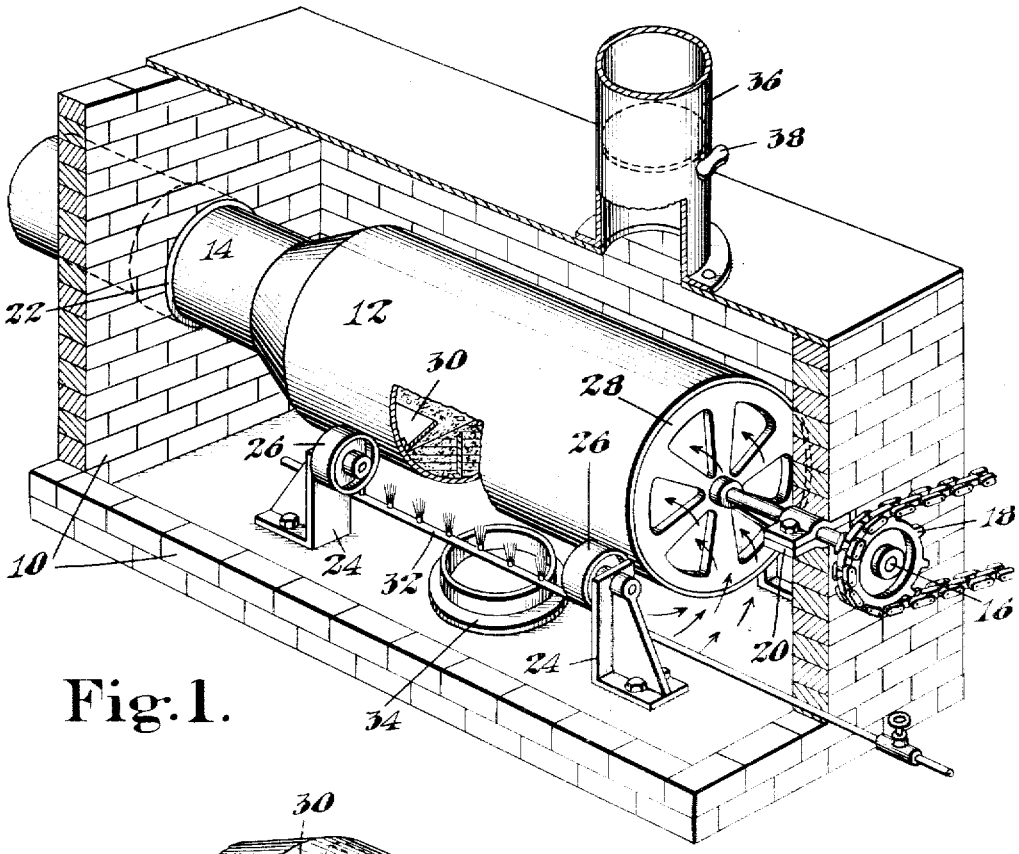
Figure 2:
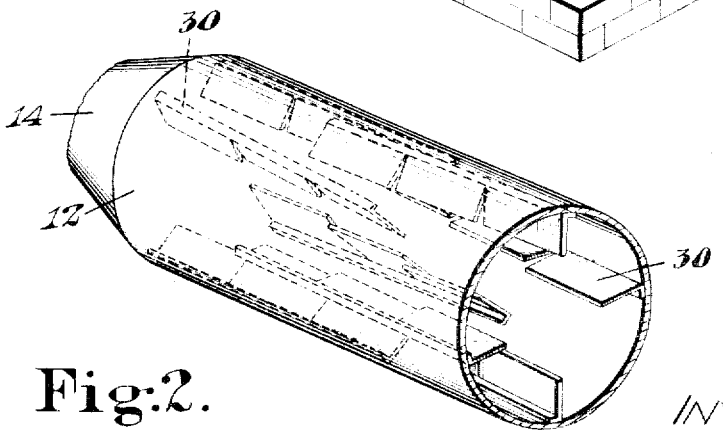

The nature of my invention will be best understood and appreciated from the following description of one suitable form of apparatus for carrying the process into effect. Such an apparatus is illustrated in the accompanying drawing, in which Fig. 1 is a perspective view in side elevation with certain portions broken away, and Fig. 2 is a view in perspective of the drum.

Referring to the drawing, it will be seen that the apparatus is enclosed within fire brick walls 10 which constitute a combustion or burner chamber. Supported in opposite walls of the chamber in suitable bearings is a horizontally disposed drum 12 having at one end a reduced extension 14 opening through one end wall of the chamber and at the other being secured to a shaft 16 carrying a sprocket wheel 18 by which rotation may be imparted to the shaft and the drum from any suitable source of power. The shaft 16 is journalled in a bearing member 20 suitably mounted in one end wall of the chamber and the extension 14 is arranged to revolve in a bearing ring 22 built into the opposite end wall of the chamber. The body of the drum 12 is supported upon antifriction rolls 26 carried by brackets 24 arranged symmetrically within the combustion chamber.

The large or right-hand end of the drum 12 contains a spider 28 having open sectors therein for the passage of air or gas and a hub for the reception of the shaft 16. Within the drum are secured two series of vanes or fins 30, all of which are downwardly inclined toward the center of the drum and which serve, as the drum is rotated, to pick up carbon black from the mass contained therein and spill it back again, thus agitating it and continuously shifting it inwardly from both ends of the drum toward the center thereof. The result is that the carbon black is thoroughly exposed to and intimately mixed with the current of air or gas passing longitudinally through the drum.

An elongated gas burner 32 extends into the combustion chamber beneath the drum 12 and this serves not only to heat the drum and the carbon black contained therein but to create a current of hot gases which pass into the drum through the inlet openings of the spider 28 and out through the extension 14. An air intake opening 34 is provided beneath the burner 32 and a stack 36 having a damper 38 projects from the roof of the combustion chamber whereby the gases may escape when the drum is being charged or emptied. The volume of gas flowing through the drum 12 may be increased by partially opening the damper 38.

In carrying out the process of my invention, a charge of commercial carbon black is introduced into the drum through the inlet at the left end thereof and the drum is then rotated continuously, maintaining the black in a condition of constant agitation. If it is desired to improve and modify the properties of the carbon black for the purpose of adapting it for use in the manufacture of printing inks, the burner may be adjusted to maintain the drum at a temperature of 750 to 800° F.

The process is continued under these conditions for a period of 75 minutes with a charge of about 50 pounds. Hot gases with considerable atmospheric oxygen pass through the drum 12 and are intimately mixed with the hot carbon black as it is spilled about within the drum. The treatment improves the length of flow of the carbon black, removes its original iridescence, and best adapts its characteristics of body and fluidity of mixture for use as an ingredient in ink. The carbon black is also probably improved by the removal of traces of oils and hydrocarbons therefrom. The reaction upon the carbon black is principally oxidation. The "value" or volatile matter in the resulting product is increased from 5% to 13% as compared to the volatile content of the original material. The United States Bureau of Mines is authority for the statement that the volatile content of commercial carbon black runs from 5.33% to 14.44%, although in practice a wider range is sometimes encountered. In practicing the present invention, in specific cases the volatile content of commercial carbon black has been increased to from 5.7% to 16.32%, removing traces of oil and hydrocarbons in the process.

If it is desired to secure a product having a deeper color, the process may be continued for a longer interval, for example, 90 minutes, and under these circumstances the length and flow of the carbon black will be somewhat reduced while the color will be modified as explained. The color may be increased to a greater degree by prolonging the treatment still further. In other words, as the treatment is continued the length and flow of the carbon black reach a maximum and then begin to decrease, while color continues to improve. The treatment is accompanied by definite loss of weight in the charge of carbon black and this factor must be reckoned with in determining the practical commercial limits in the time of treatment. A loss of approximately 35% due to combustion is to be expected under the conditions set forth above.

I have explained how the process of my invention may be carried out in modifying certain characteristics of carbon black. I contemplate that all the various characteristics or properties of carbon black may be advantageously modified and among these properties I include color, length, flow, iridescence, top tone, under tone, tinting strength, value or amount of volatile matter, capacity for absorption or adsorption, and activity. These properties may be affected by suitably varying the different factors of the process, such as temperature, character of flame, and composition of flue gases, stirring of material, speed of drum rotation, and time. These factors are more or less interdependent but may be varied to give the results best suited for requirements of each particular case. For example, temperatures between 600° and 1000° F. have been employed with satisfactory results in accordance with the characteristics desired in different products. The addition of oxygen to carbon black is slowly effected at the lower temperatures but takes place rapidly at the higher temperatures. The lower temperatures employed are, therefore, limited by the practical considerations of commercial output while, to a large extent, the higher temperatures are limited by the difficulties incident to accurate control of the oxidation process. In all cases, however, the method of my invention is carried out at temperatures below those at which calcining of the carbon black can occur, i. e., below 1200° F., and at such temperatures there is no loss of the volatile content of the carbon black.

It will be understood that the apparatus illustrated is typical only of one satisfactory construction and that in practice it may be modified in arrangement and operation from that described. For example, the burner may be arranged to heat the drum indirectly, as in a muffle furnace, and the air ports may be located in different parts of the combustion chamber from those shown.

The term carbon black is used herein as including within its scope any black suitable for the raw material of ink or which has the properties of the carbon black of commerce.

Having thus described my invention, what I claim as new and desire to secure by Letters Patent is:

1. The method of treating carbon black to modify its properties, which consists in subjecting a measured volume thereof to the action of heat not exceeding 1000 degrees F. and oxygen in controllable quantities, and simultaneously causing an agitation of the carbon black for an interval during which the stable oxygen content of the carbon black is increased.

2. The method of treating carbon black to modify its properties, which consists in confining a measured volume thereof within a horizontally-disposed drum, causing a surface flow of the carbon black by rotating the drum, stirring the carbon black to expose fresh surfaces, and flowing gases, including oxygen, of controllable composition over and through the carbon black, while maintaining the same at a temperature to increase the oxygen content of the carbon black, all for a portion of the interval of time during which increase in oxygen content occurs.

3. The method of increasing the length and flow of carbon black for use in printing inks, which consists in subjecting it to the controlled action of an oxidizing gas while maintained at a temperature of 750–800 degrees F. for a period of approximately 75 minutes, thereby increasing the oxygen content of the carbon black which is not eliminated by combustion in the treatment.

4. The method of increasing the volatile content of carbon black, which consists in agitating a measured charge thereof and slowly oxidizing the same at a temperature not exceeding 1000 degrees F., incidentally eliminating some carbon black by combustion.

5. The method of intensifying the color of carbon black, which consists in continuously agitating a measured charge thereof and subjecting the same to a slow oxidation at a temperature below that at which calcining takes place but sufficiently high to increase the stable oxygen content of the carbon black.

6. The method of treating carbon black to modify its properties, which consists in subjecting commercial carbon black to the action of heat not exceeding 1000 degrees F. and oxygen in controllable quantities, and simultaneously causing an agitation of the carbon black for an interval during which the stable oxygen content of the carbon black is increased.

7. The method of treating carbon black to modify its properties, which consists in confining commercial carbon black within a horizontally-disposed drum, causing a surface flow of the carbon black by rotating the drum, stirring the carbon black to expose fresh surfaces, and flowing gases, including oxygen, of controllable composition over and through the carbon black, while maintaining the same at a temperature to increase the oxygen content of the carbon black, all for a portion of the interval of time during which increase in oxygen content occurs.

8. The method of increasing the volatile content of carbon black, which consists in agitating commercial carbon black and slowly oxidizing the same at a temperature not exceeding 1000 degrees F., incidentally eliminating some carbon black by combustion.

9. The method of intensifying the color of carbon black, which consists in continuously agitating commercial carbon black and subjecting the same to a slow oxidation at a temperature below that at which calcining takes place but sufficiently high to increase the stable oxygen content of the carbon black.

10. The method of treating carbon black to modify its properties, which consists in continuously agitating commercial carbon black and subjecting the same to a slow oxidation at a temperature below that at which calcining takes place but sufficiently high to increase the stable oxygen content of the carbon black.

EDWARD H. DAMON.